United States Patent Office 3,358,145
Patented Dec. 12, 1967

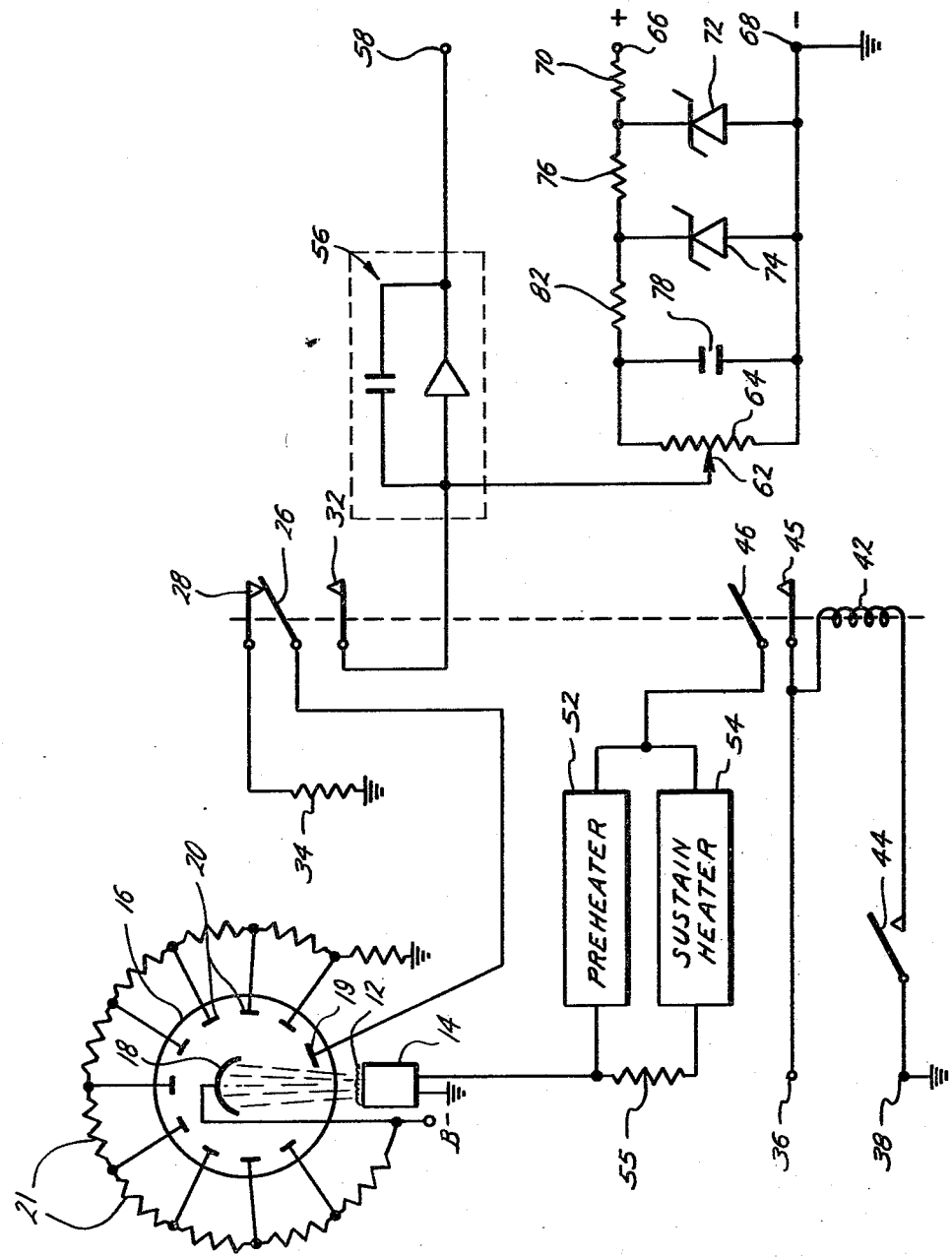

3,358,145
RADIATION DETECTOR READOUT SYSTEM
Kenneth D. Cashion, Friendswood, and Benny R. Baker, Houston, Tex., assignors to the United States of America as represented by the Administrator of the National Aeronautics and Space Administration
Filed Dec. 29, 1964, Ser. No. 422,100
1 Claim. (Cl. 250—207)

ABSTRACT OF THE DISCLOSURE

The circuit of the present invention utilizes a highly stable variable current source which is combined with the "dark" current signal when no light signal is fed into a photomultiplier tube, and causes the resultant output signal of the circuit to be zero. When an input light signal is fed into the photomultiplier tube, with the current source connected to the circuit having a value equal to but opposite in polarity to the "dark" current of the photomultiplier tube, the resultant output signal is proportional to the input signal, and low intensity light signals may be readily measured by the circuit since the signal-to-noise ratio has been substantially reduced.

---

The invention described herein may be manufactured and used by or for the Government of the United States of America for governmental purposes without the payment of any royalty thereon or therefor.

This invention relates in general to radiation detector readout systems and, more particularly, to an electrical circuit for determining the amount of light detected by a photomultiplier tube wherein the output signal is in the "dark" current range of the tube.

Exposure to ionizing radiation, such as X-ray, gamma ray, cosmic rays, and nuclear radiation, is an increasingly serious hazard to human beings. To avoid excessive dosage, persons exposed to biologically harmful radiation must monitor the total radiation which their bodies receive. A relatively new type of dosimeter, incorporating a thermoluminescent material, utilizes the phenomenon of thermoluminescence to determine dosage. In thermoluminescence, ionizing radiation causes an entrapment of electrons within a crystal structure which are released with emission of visible light from the trapped condition when the thermoluminescent material is heated after exposure to the ionizing radiation.

To determine the amount of ionizing radiation when the material, the visible light emitted therefrom is impinged upon the photocathode of a photomultiplier tube. Electrons emitted from the photocathode, upon incidence of light thereon, produce a small current flow which, after amplification in the tube itself, is amplified to a suitable magnitude to operate an indicator for measuring the intensity of the incident light. When the input signal is relatively small, for example, when the total radiation, which the thermoluminescent dosimeter receives, is in the range of ten to five hundred milliroentgens, the resultant output signal may be in the magnitude of the "dark" current of the photomultiplier tube comprised of the sum of the leakage currents across the elements of the tube, and of the random emission from the photocathode in the absence of light. In order to enable the detection and reliable measurement of extremely weak sources of light, it becomes necessary to reduce the "dark" current and thereby improve the signal-to-noise ratio of the resultant output signal.

Heretofore, one method of improving the signal-to-noise ratio of the photomultiplier consisted of modulating the light signal so that the output signal is connected to an alternating signal, and may be separated from the "dark" current which is not modulated and measured independently. Prior methods of modulation of the light signal included use of a whirling disc, with one or more holes in it, through which the light passes to the photocathode. Alternatively, electrical modulating means have been provided, such as cyclically varying the potential between the photocathode and first dynode of the photomultiplier tube, so that signal current will flow when the dynode is positive with respect to the photocathode, and will not flow when the dynode is negative with respect to the photocathode. Both the mechanical and electrical modulating means described require either a mechanical system or electrical circuitry which, while effective, are complex and subject to periodic failure.

Another method of eliminating the "dark" current effect has been to utilize a second photomultiplier tube connected to the first photomultiplier tube so that the "dark" current effect of the first tube is cancelled by the second photomultiplier tube. The tubes are connected so that the "dark" current from each tube opposes each other. The drawbacks to such a system are the necessity of a second photomultiplier and, further, the requirement that both tubes must be matched so that the "dark" currents of both tubes are equal.

In order to overcome many of the attendant disadvantages of prior circuits, and to provide a circuit which accurately and simply eliminates "dark" current effects of photomultiplier tubes, the circuit of the present invention utilizes a highly stable variable current source which, when combined with the "dark" current signal when no light signal is fed into the photomultiplier tube, causes the resultant output signal of the circuit to be zero. Thus, when an input light signal is fed into the photomultiplier tube, with the current source connected to the circuit having a value equal to but opposite in polarity to the "dark" current of the photomultiplier tube, the resultant output signal is proportional to the input signal, and low intensity light signals may be readily measured by the circuit since the signal-to-noise, ratio has been substantially reduced.

More particularly, according to a preferred embodiment of the invention, a photomultiplier tube, which is operated in its "dark" current range, receives light signals from thermoluminescent material which has been exposed to radiation. The material is heated on a sample holder, and the photomultiplier tube produces an output signal proportional to the amount of light received by the photocathode of the tube from the thermoluminescent material. The system is initially operated without the sample holder and thermoluminescent material connected thereto, and the output of the photomultiplier tube is effectively combined with a highly stable current source so that the resultant combined signal is equal to zero. Then the thermoluminescent material is placed on a sample holder and heated, and the resultant output signal from the tube receiving the emitted light is proportional to the amount of the radiation present in the thermoluminescent material. The photomultiplier tube output signal is then combined with a current source signal and fed into an integrating network, the output of which is proportional to the total radiation contained in the thermoluminescent material.

Other objects, and many of the attendant advantages of this invention, will be readily appreciated as the same become better understood by reference to the following detailed description when considered in connection with the accompanying drawing wherein:

The figure is a schematic drawing of the radiation detection readout system in accordance with a preferred embodiment of the invention.

Referring now to the drawing, the radiation detector readout system may be typically used to determine the amount of radiation in thermoluminescent material 12 which has been exposed to radiation. The material 12 is placed upon a sample holder 14 which, upon heating, causes the material 12 to emit light. A photomultiplier tube 16 is arranged so that light emitted by the thermoluminescent material will be detected by the photocathode 18 of the tube 16. A signal, proportional to the amount of light which strikes the photocathode 18, is amplified by the photomultiplier tube and an output signal is derived from the anode 19 of the tube. To suitably divide the potential between the intermediate electrodes or dynodes 20 of the photomultiplier tube, series-connected resistors 21 are connected therebetween.

The anode 19 is connected to an armature 26 having a pair of contacts 28, 32 associated therewith. The armature 26 is normally connected to contact 28 which in turn is connected to a load resistor 34 to ground so that when there is no light signal applied to the cathode 18, but the photomultiplier tube is operational, a load will be present across the output thereof.

The starting circuit for heating the sample holder comprises a pair of input terminals 36, 38 which are connected across the winding of a relay 42 through a line switch 44. The input terminal 36 is further connected to a fixed contact 45 having an armature 46, which is normally open, associated therewith. The armature 46 is connected to the sample holder 14 through a pair of paths comprising a preheater 52 and a sustain heater 54. The preheater provides a large current to the sample holder 14 for an initial short period of time, whereupon the sustain heater 54, having a resistor 55 in series therewith, provides a smaller amount of current for a longer duration. In this manner the sample holder is heated with approximately an even amount of heat upon energization of the circuit so that the same relatively constant amount of heat may be applied to all samples to be tested.

Output signals from the photomultiplier tube are fed from the contact 32 to the input terminal of a standard Miller integrator circuit 56. The circuit 56 provides an output signal at the terminal 58 which is proportional to the integral of the input voltage.

A highly stable variable current source, which is used to eliminate the "dark" current of the photomultiplier tube, is also connected to the input of the circuit 56 through a movable contact 62 connected to a resistor 64. The current source comprises a pair of input terminals 66, 68 across which D.C. voltage is applied. A resistor 70 is connected between the terminal 66 and the cathode of a first zener diode 72 whose anode is connected to the terminal 68. The cathode of the diode 72 is also connected through a resistor 76 to the cathode of a second zener diode 74 whose anode is connected to terminal 68. Connected across the resistor 64 is a capacitor 78, one side of the capacitor also being connected to the cathode of the zener diode 74 through a resistor 82 and the other side of the capacitor being connected to the terminal 68.

The D.C. voltage applied to the terminals 66, 68 is of a sufficient value to break down the zener diode 72. The voltage across the zener diode 72 is applied across the resistor 76 and zener diode 74, and is of sufficient value to break down the zener diode 74. The voltage across the zener diode 74 is applied across the series combination of the resistors 82 and 64. Further, since the capacitor 78 is charged to the value of the voltage across the resistor 64, should fluctuations in voltage occur across the zener diode 74, they will be minimized across the resistor 64, thus providing an extremely stable D.C. voltage thereacross.

The setting of the movable contact 62, to determine the "dark" current level of the photomultiplier tube, is determined by first operating the system without the sample holder and thermoluminescent material therein. Upon closing of the switch 44 the relay 42 is energized, disconnecting armature 26 from contact 28 and connecting it to contact 32. This in turn causes the output of the photomultiplier tube to be fed to the input of the integrating circuit 56 instead of the load resistor 34. Simultaneously, the energization of the relay 42 causes armature 46 to connect with contact 45, energizing the preheater 52 and sustain heater 54. The output of the photomultiplier tube, which will now be equal to the "dark" current of the tube, is fed to the input terminal of the integrating circuit 56. Simultaneously, contact 62 is adjusted to also apply to the input terminal a signal equal to the "dark" current signal but having an opposite polarity. Thus the output signal of the integrating circuit will be constant and may be read on the meter connected to the output terminal 58 of the integrating circuit.

The circuit is then operated with thermoluminescent material and the sample holder in the circuit. Output signals present at the terminal 58 will be equal to the integrated output of the radiation present in the thermoluminescent material 12, and the effect of "dark" current signals from the photomultiplier tube is eliminated.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

A radiation detector readout system for converting radiation into light and measuring this light, said system comprising:

a photomultiplier tube having a light sensitive cathode, an anode, and intermediate electrodes arranged therebetween;

an integrating circuit having an input terminal and an output terminal;

switching means connecting the anode of said photomultiplier tube to a load when no light signal is present at said light sensitive cathode, and connecting the anode to said input terminal when a light signal is present at said cathode;

means connected to said integrating circuit input terminal for supplying a current equal in magnitude and opposite in polarity to the "dark" current signal of said photomultiplier tube whereby the signal at said integrating circuit output terminal is independent of said "dark" current signal, said last mentioned means comprising a highly stable variable current source containing:

(a) a first resistor and a zener diode connected in series across a source of D.C. potential having a sufficient magnitude and polarity so as to allow said zener diode to operate in its voltage regulator state;

(b) a series circuit connected across said zener diode comprising a second resistor and the parallel combination of a capacitor and a third resistor; and (c) a movable contact connected at one end to said third resistor and connected at its other end to said input terminal.

References Cited

UNITED STATES PATENTS

| 2,743,374 | 5/1956 | McCreary | 250—214 |
| 2,777,948 | 1/1957 | Henderson | 330—42 X |
| 3,209,153 | 9/1965 | Frenk | 250—207 |
| 3,296,445 | 1/1967 | Koos et al. | 250—207 |

FOREIGN PATENTS 682,688   11/1952   Great Britain.

WALTER STOLWEIN, *Primary Examiner.*